(12) United States Patent
Habot

(10) Patent No.: US 12,523,459 B2
(45) Date of Patent: Jan. 13, 2026

(54) SYSTEM FOR MEASURING A CHANGING CRACK IN A WALL OR THE LIKE

(71) Applicant: FEELBAT, Saint-Denis (FR)

(72) Inventor: Jean-Christophe Habot, Saint Gilles les Hauts (FR)

(73) Assignee: FEELBAT, Saint-Denis (FR)

( * ) Notice: Subject to any disclaimer, the term of this patent is extended or adjusted under 35 U.S.C. 154(b) by 393 days.

(21) Appl. No.: 18/247,285

(22) PCT Filed: Sep. 28, 2021

(86) PCT No.: PCT/FR2021/051673
§ 371 (c)(1),
(2) Date: Mar. 30, 2023

(87) PCT Pub. No.: WO2022/069830
PCT Pub. Date: Apr. 7, 2022

(65) Prior Publication Data
US 2023/0408237 A1  Dec. 21, 2023

(30) Foreign Application Priority Data
Sep. 30, 2020  (FR) ........................................ 2009980

(51) Int. Cl.
*G01B 3/18*  (2006.01)
(52) U.S. Cl.
CPC ..................... *G01B 3/18* (2013.01)
(58) Field of Classification Search
CPC ............. G01B 3/18; G01B 5/14; G01B 5/30
See application file for complete search history.

(56) References Cited

U.S. PATENT DOCUMENTS

| | | | | |
|---|---|---|---|---|
| 5,459,936 | A | * | 10/1995 | Stange ..................... G01B 3/38 33/529 |
| 11,971,251 | B2 | * | 4/2024 | Lowitz ..................... G01B 5/14 |
| 2017/0184386 | A1 | * | 6/2017 | Tagawa ..................... G01B 5/14 |
| 2023/0408237 | A1 | * | 12/2023 | Habot ..................... G01B 5/14 |

FOREIGN PATENT DOCUMENTS

| | | | |
|---|---|---|---|
| CN | 219328418 U | * | 7/2023 |
| FR | 2274021 A1 | | 1/1976 |
| FR | 2784178 B1 | | 11/2000 |
| FR | 2965612 B1 | | 1/2016 |

(Continued)

OTHER PUBLICATIONS

International Written Opinion for Application No. PCT/FR2021/051673 dated Jan. 11, 2022, 5 pages.

(Continued)

*Primary Examiner* — Yaritza Guadalupe-McCall
(74) *Attorney, Agent, or Firm* — TraskBritt

(57) ABSTRACT

A system for measuring a changing crack, comprises: a measurement device comprising a body bearing a measurement instrument and having a first positioning means, and a movable member comprising a second positioning means; at least two targets that are able to cooperate with a positioning means, wherein the at least two targets are hemispherical in shape and wherein the positioning means consist of rings having a cross section that is smaller than the base section of the target.

13 Claims, 7 Drawing Sheets

(56) References Cited

FOREIGN PATENT DOCUMENTS

GB          2246863 A     2/1992

OTHER PUBLICATIONS

International Search Report for Application No. PCT/FR2021/051673 dated Jan. 11, 2022, 2 pages.
Resensys. "SenSpot(TM) Displacement Meter" Apr. 23, 2019, https://web.archive.org/web/20190423044748if_/http:resensys.com/documents/DisplacementSenSpot.pdf, 3 pages.
Resensys. "Wireless Displacement/Crack Meter SenSpot(TM) Snsor" Aug. 21, 2018, https//:www.resensys.com/senspot-displacement.html, 2 pages.

\* cited by examiner

SYSTEM FOR MEASURING A CHANGING CRACK IN A WALL OR THE LIKE

CROSS-REFERENCE TO RELATED APPLICATIONS

This application is a national phase entry under 35 U.S.C. § 371 of International Patent Application PCT/FR2021/051673, filed Sep. 28, 2021, designating the United States of America and published as International Patent Publication WO 2022/069830 A1 on Apr. 7, 2022, which claims the benefit under Article 8 of the Patent Cooperation Treaty to French Patent Application Serial No. FR2009980, filed Sep. 30, 2020.

TECHNICAL FIELD

The present disclosure relates to the field of metrology and, more particularly, to measuring and monitoring over time the change in the relative positioning of two parts of a structure, especially for monitoring cracks in a structure such as a wall of a building, that is to say the change in the distance between a first point located on one side thereof and a second point on the opposite side thereof. This type of device is particularly applicable in the construction field. Specifically, when cracks appear in a structure, it can be of great importance to determine the change in the size of these cracks and/or in the deformation of the system in a precise manner, in order to ascertain the severity thereof relative to the structure itself, and therefore specify the most appropriate repair.

BACKGROUND

It is common for buildings and structures to require constant or intermittent observation, since construction materials change with time, soils shift, and the forces to which the structure or building is subjected by the wind, seismic tremors or caused by industrial equipment may affect the quality, safety and comfort of the structure. To monitor these changes and make clear the actions to be taken to stabilize or secure the building or structure, it is necessary to have factual and reliable information on the nature of the phenomena to be observed (cracks, displacements, slips, tilts) and to measure deterioration, stabilization and even cyclical changes over time. The regular readings of this information are displayed on graphs and will show the trend of the defect and the type of repair to be envisaged.

In order to carry out such monitoring, various types of gauges have been provided that make it possible to measure the change in cracks, on a single axis and in a single plane, or in different directions in a same plane over certain distances ranging from a few millimeters to multiple decimeters, or else the change in planes perpendicular to the surface, resulting in misalignment of walls or deleveling of soils or ceilings, or tilt, or else in a change in inclination or even multiaxial deformations. Generally, a specific type of gauge is used for each of these different types of change.

For example, a measurement device disclosed in patent FR2965612 is known in the prior art, which device consists of a measurement device including a body bearing a measurement member, of a target formed by a base for attachment to the wall on one side of the crack and having a reference target surface extending perpendicular to the wall when the target is attached to a wall, and of a plate including a base for attachment to the wall on the other side of the crack. This plate bears positioning means that are able to interact with a counterpart positioning means on the device body so that when the measurement member is in place on the plate, the measurement member can interact with the target surface.

This device makes it possible to measure the change in a crack in one direction, perpendicular to the surface of the target's reference surface, but not the change in a slip perpendicular to the surface of the wall, or in a direction other than perpendicular to the reference surface. In addition, dust between the reference surface and the body of the measurement device, or even just poor positioning, results in measurement errors.

Patent FR2274021 discloses another example of a device for measuring the change in a crack, characterized in that it includes two measurement elements, each element being attached to a respective part of the wall on either side of the crack, these two elements including means for measuring the relative displacement of one with respect to the other. This device is also limited to measurement along a single axis.

Patent GB2246863A discloses a gauge for monitoring cracks comprising two plates each having a portion provided with markings and a securing portion, by virtue of which the plates can be secured to respective portions of a structure with the portions with the markings in a mutual sliding overlapping relationship, whereby the relative movement of the markings with respect to one another provides an indication of the relative movement of the building portions, at least one of the securing portions being hinged to its associated portion for displacement to lie in a direction transverse to the mutual sliding overlapping plate portions.

Patent FR2784178 discloses a device for measuring the change in the distance between a first point and a second point of a structure (which may especially be cracked or deformed), comprising a first element that is intended to be secured to the first point and a second element that is intended to be secured to the second point, characterized in that it comprises means for measuring the relative displacement between the first element and the second element in three dimensions. There is a telescopic arm provided at one of the ends thereof with a ball-and-socket joint or a universal joint mounted on the first element. By virtue of such a ball-and-socket joint, the end of the telescopic arm can move with three degrees of freedom, namely two degrees of freedom defined by the ball-and-socket joint itself and a third degree of freedom defined by the telescopic nature of the arm. The telescopic arm can be replaced with any other system that includes at least two longitudinal elements mounted slidably relative to one another, for example, by virtue of a slide or like element. However, such connections are poorly suited to environments where dust, moisture and changes in temperature hinder the proper operation of ball-and-socket joints and slide systems.

The solutions of the prior art have different drawbacks. Firstly, it is generally necessary to have multiple gauges to analyze changes along three axes, with high precision.

For the solution with a ball-and-socket joint, it is difficult to ensure reliable measurement with connected surfaces that deteriorate over time.

The gauges of the prior art are not all suitable for measuring movement variations over long distances (greater than 5 cm).

The current gauges require positioning very close to the crack, which may be difficult or impractical if the support is eroded leaving few alternatives for attachment (eroded coating, disaggregated concrete or a boulder).

Lastly, to ensure satisfactory positioning, the gauges of the prior art require multiple points of attachment to the wall to be analyzed.

The current gauges are highly visible and highly susceptible to vandalism due to their colors, their structural fragility or their protruding shapes.

BRIEF SUMMARY

In order to overcome these drawbacks, the present disclosure relates in its most general sense to a system for measuring a change in a crack in a wall or the like or even a natural wall, for example, a rock wall, including:
- a measurement device that includes a body bearing a measurement instrument and having a first positioning means, and a movable member including a second positioning means; and
- at least two targets that are able to interact with a positioning means, characterized in that:
- the targets are hemispherical in shape and in that the positioning means consist of rings having a cross section that is smaller than the cross section of the base of the target.

Preferably, one of the positioning means of the measurement device has two rings whose longitudinal axes are perpendicular.

The spherical or planar shape and the size of the gauges confer excellent resistance to bad weather, external attack (UV or mechanical) and discretion on the supports used.

According to one variant, the targets are attached to the wall by drop-in anchors and/or two-part epoxy adhesive.

According to one preferred embodiment, the body has a cavity of complementary shape to the housing of a digital vernier (or capacitive-sensing electronic scale) and a ring on its opposite face.

Advantageously, the system further includes a calibration accessory consisting of a base equipped with two hemispherical domes whose axes are parallel, and a third hemispherical dome whose axis is perpendicular to the preceding two axes.

According to one variant, the system further includes an inclination-measuring accessory consisting of a base equipped with a first fixed hemispherical dome (104) and an arm bearing a pendulum that has a second fixed hemispherical dome at the end thereof.

According to one variant, the system further includes an accessory for measuring shear or misalignment consisting of a base that has curved grooves into which are fitted tabs provided at the front end of a body, the rear end of which can accommodate a hemispherical dome, the body including a lateral arm that has at the end thereof two hemispherical domes whose axes of symmetry are perpendicular to the mid-plane of the body and of the arm.

Preferably, at least part of the hemispherical domes is striated in order to facilitate demolding for the requirements of plastic injection molding.

The present disclosure also relates to a measurement device for measuring the distance between two targets, characterized in that the measurement device includes a body bearing a measurement instrument having a first positioning means, and a movable member including a second positioning means, the positioning means being made up of rings.

The present disclosure also relates to a target for measuring the change in a crack, characterized in that it is hemispherical in shape with a cross section that is larger than the cross section of a positioning ring with which a measurement device is equipped.

BRIEF DESCRIPTION OF THE DRAWINGS

The present disclosure will be better understood from reading the following description, which relates to non-limiting exemplary embodiments illustrated by the appended drawings, in which.

DETAILED DESCRIPTION

Figure 1:
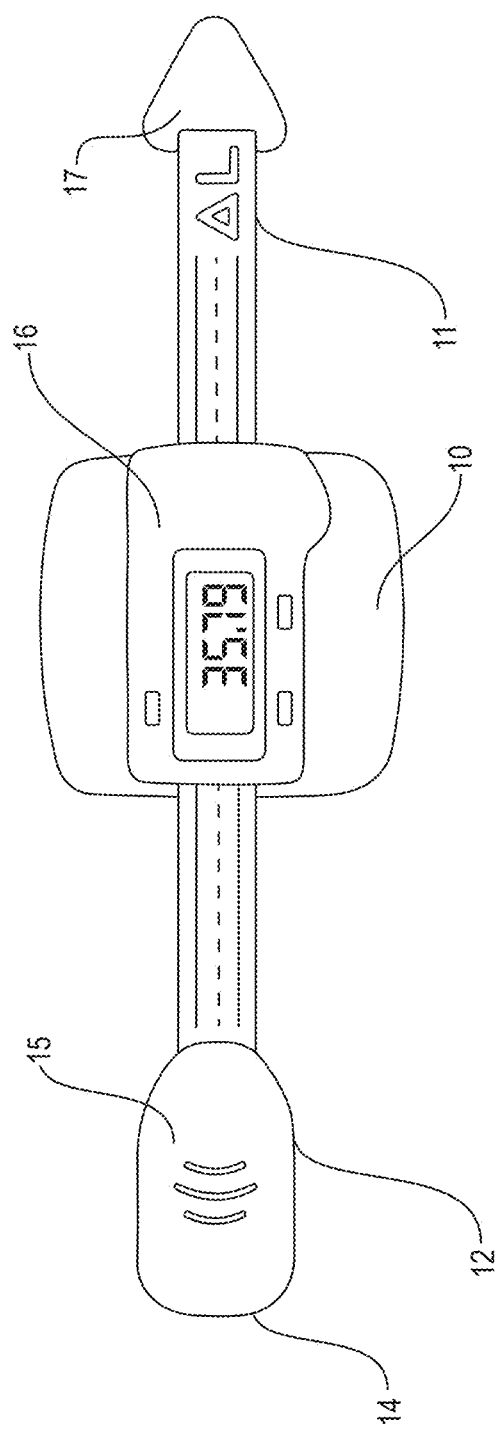
FIG. 1 shows a view from above of the measurement body.
Figure 2:
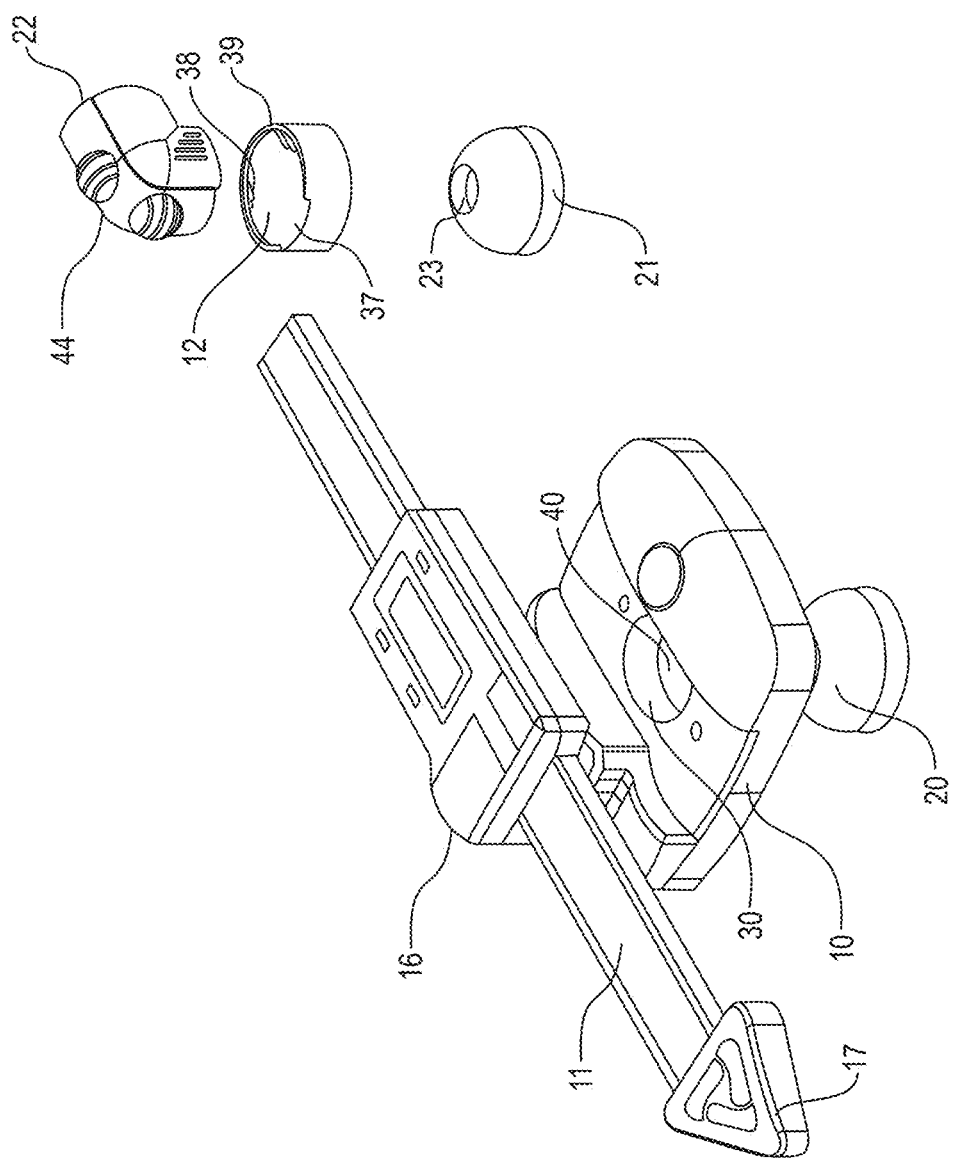
FIG. 2 shows a perspective view of the measurement body and an exploded view of a positioning means.
Figure 3:
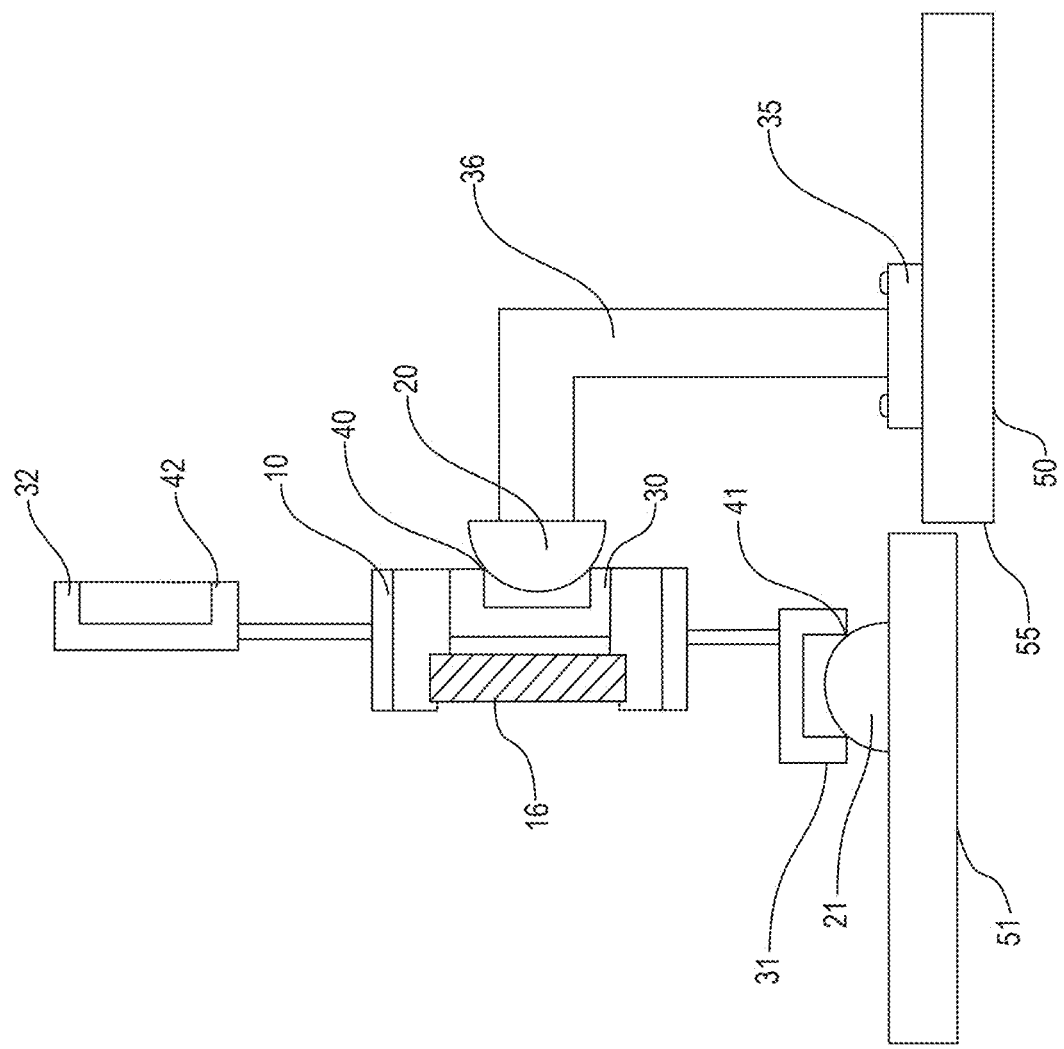
FIG. 3 shows a schematic view of the measurement body and of the positioning means.

The device for measuring a change in a crack in a wall or the like according to the present disclosure comprises a system formed by:
- a measurement device (16) shown in FIG. 1; and
- studs that are intended to be attached to the wall, and have hemispherical targets (20, 21), which have various configurations to allow adaptation to the various defects that may require monitoring.

The targets (20, 21) are hemispherical or semi-elliptical in shape. In the case of an ellipsoidal shape, the height of the hemispherical projection is slightly greater than the radius of the cross section of the base of the projection, for example, 1.1 times the radius. This hemispherical target (20, 21) may have a central aperture (23) passing therethrough, which allows it to be attached directly to a wall using a drop-in anchor and/or strong two-part epoxy adhesive. It may also be attached to a base or extend an anchor base.

The measurement device comprises a vernier, for example, a digital vernier (16), which is attached to a body (10) and has a foot (11) that slides relative to the body (10) of the Vernier (16). The position of the foot (11) relative to the body (10) determines the extension and therefore the distance between two points measured between two hemispherical targets (20, 21).

The body (10) on the one hand, and the foot (11) on the other hand, are provided with positioning means (10, 12).

These positioning means include a ring (30, 31, 32) defining a peripheral strip that bears on the surface of the corresponding hemispherical target (20, 21). The diameter of the rings (30, 31, 32) is smaller than the diameter of the base of the hemispherical targets (20, 21). The diameter of the rings (30, 31, 32) corresponds to the diameter at mid-height of the hemispherical targets (20, 21).

This interaction between the peripheral edge (40, 41, 42) of a ring (30, 31, 32) and the surface of the dome of the hemispherical target (20, 21) ensures very precise positioning, self-centering and low sensitivity to dust.

The rings (30, 31, 32) may comprise an insert made of Nylon (PEEK) (trade name) or of a ring made of metal or Nylon (PEEK), or else of a rigid and smooth material overmolded in a plastic material forming the base.

The digital vernier (16) is mounted on the body (10), which is in the form of a plate having a cavity of complementary shape to the housing of the digital vernier (16) in order to ensure a fit without play. The body (10) has a ring (30) whose peripheral edge (40) can bear against the surface of the dome of a hemispherical target (20, 21). The foot (11) of the vernier has one end that engages in a connecting part (12) that has a notch (37) whose width corresponds to the width of the foot (11), and two fitting projections (38, 39) that allow the end of the foot (11) to be positioned relative to a ring housed in the lower portion of the connecting plate (12). The other end of the foot (11) is provided with a part (17) that has, on one of the side faces, a slot that opens onto a housing to allow engagement with the end of the foot (11).

These two plates (body plate 10, connecting plate 12) constitute the means for positioning the digital vernier (16) on the domes of the hemispherical targets (20, 21) in a very precise and reliable manner, and therefore for determining the distance between the longitudinal axis of the rings positioned on these domes of the hemispherical targets (20, 21) in a repeatable manner.

Preferably, the measurement device includes three rings (30, 31, 32), two of which have parallel axes, and the third one a perpendicular axis, to allow use with the domes of the hemispherical targets (20, 21) that are arranged substantially in the same plane, or else domes that are offset to measure the shear between two regions (50, 51) on either side of a crack (55).

The domes of the hemispherical targets (20, 21) may be attached directly to the wall, or else mounted on a base including a plate (35) and an extension (36).

Figure 4:
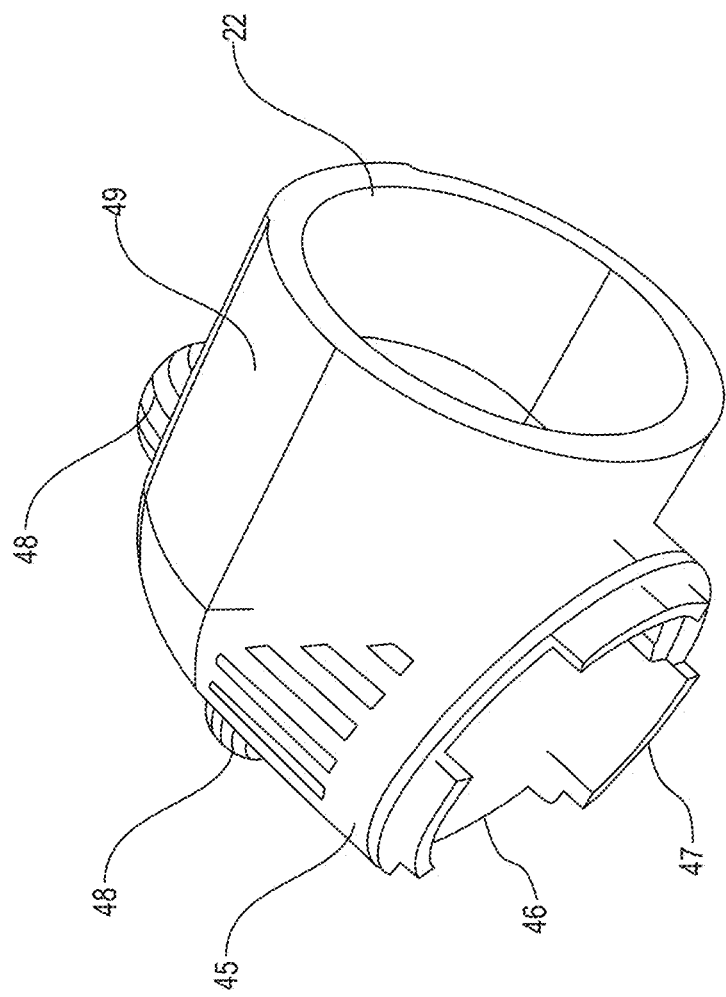
FIG. 4 shows a perspective view of the bent extension.

The connecting plate (12) may accommodate a bent part (44), which is shown in more detail in FIG. 4. This bent part (44) has a first portion (45) that has a slot (46) for the rear end of the foot (11) to pass through, and shoulders (47) for snap-fitting onto the connecting plate (12). The part is extended by a second portion (49) that extends along an axis perpendicular to the axis of the first portion (45). This second portion (49) has a ring (22) that can be positioned on a hemispherical dome. The first and second portions (45, 49) have hemispherical projections (48) that have slots to facilitate demolding in the case where the bent part (44) is produced by plastic injection molding.

Measuring Change in the Crack Through Shear or Misalignment

Figure 5:
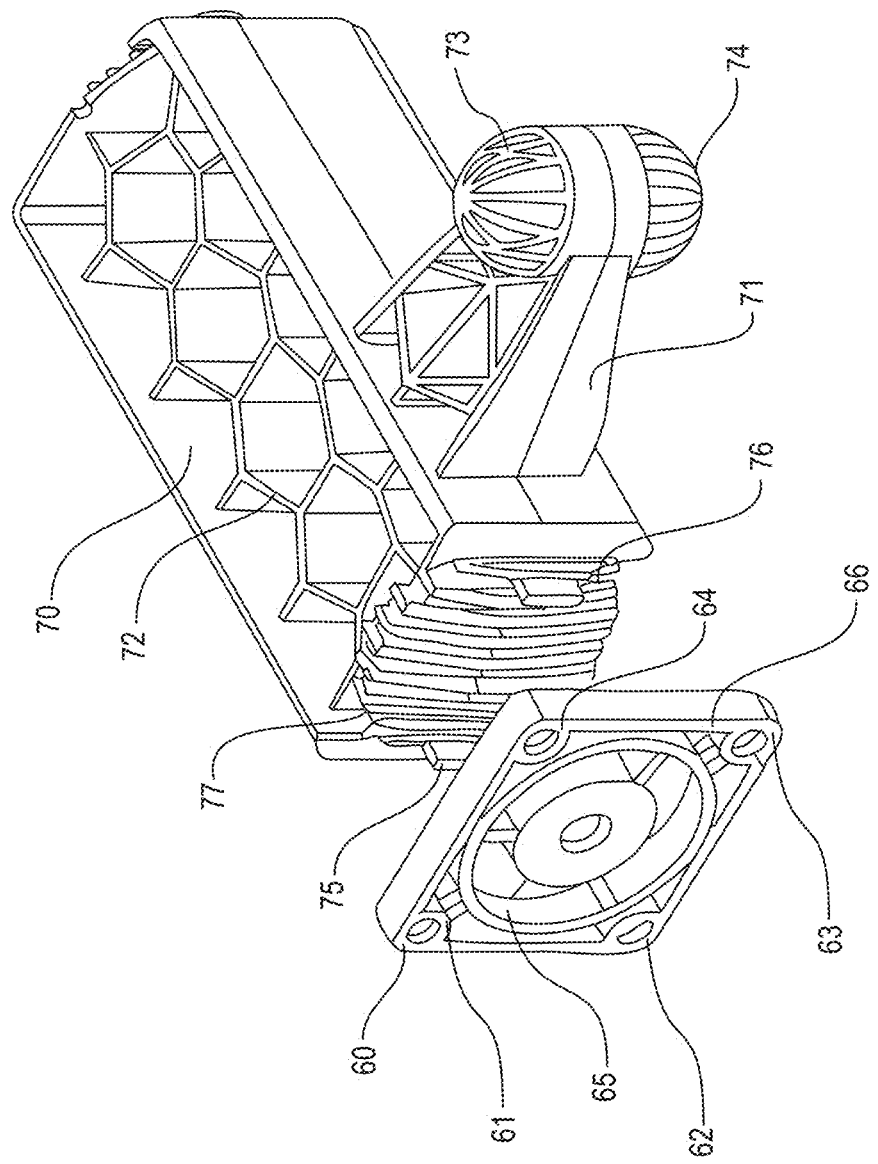
FIG. 5 shows a perspective view of an accessory for measuring a shear.

FIG. 5 shows a perspective view of an accessory for monitoring deformation through shear or misalignment. The accessory comprises a base (60) that has holes (61, 62, 63, 64) for drop-in anchors for attachment to the wall, floor or ceiling. This base (60) also has curved grooves (65, 66) into which are fitted tabs (75, 76) provided at the front end of a body (70), the rear end of which can accommodate a hemispherical dome. This body (70) is produced by plastic injection molding and has inner walls (72) for rigidity, and a lateral arm (71) that has at the end thereof two hemispherical domes (73, 74) whose axes of symmetry are perpendicular to the mid-plane of the body (70) and of the lateral arm (71).

The front face (77) of the body (70) has striations that form a hemispherical surface complementary to a concave accommodating surface provided on the rear face of the base (60). The hemispherical portions of front face 77 and hemispherical domes 73, 74 are structured to facilitate the demolding of a part produced by plastic injection molding.

Measuring Change Through Rotation/Tilt

Figure 6:
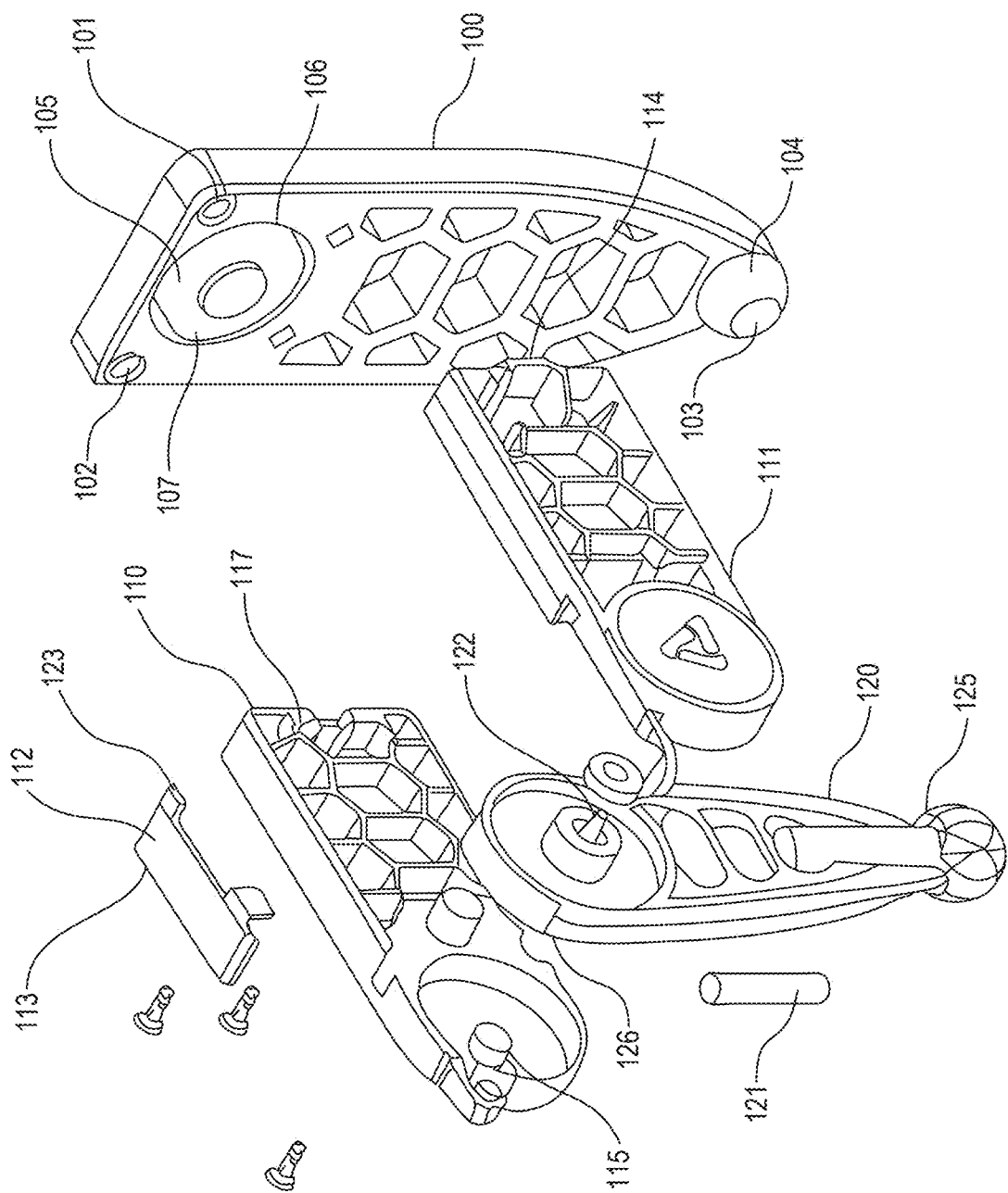
FIG. 6 shows a perspective view of an accessory for measuring a change through rotation/tilt.

FIG. 6 shows a perspective view of an accessory for monitoring deformation through rotation or tilt. The accessory comprises a pendulum-like element, with a plate (100) that is intended to be attached to the wall by drop-in anchors through holes (101, 102, 103). The plate (100) includes a hemispherical dome (104) that extends perpendicular to the surface with which the plate (100) bears on the wall.

The plate (100) also includes a base (105) with two curved grooves (106, 107) to accommodate an arm formed of two half-shells (110, 111) extending perpendicular to the surface with which the plate (100) bears on the wall. This arm has tabs (114) on its rear face for snap-fitting to the plate (100). The two half-shells (110, 111) have a housing (115) for accommodating the shaft (122) that bears a pendulum (120).

The pendulum (120) comprises a molded part weighted by a metal bob (121). The pendulum (120) has a hemispherical dome (125) at the lower end thereof. At rest, this pendulum (120) is at equilibrium in the vertical position.

The vernier allows measurement between the two hemispherical domes (104, 125). To facilitate measurement, there is a brake formed by a strip (112) provided with two lateral pivots (113, 123) that engage in cavities (117) made in the half-shells (110, 111). The lower surface of the strip (112) comes into contact with the upper surface (126) of the pendulum to block its motion in order to allow the distance between its hemispherical dome (125) and the fixed hemispherical dome (104) of the plate (100) to be measured.

Calibration Accessory

Figure 7:
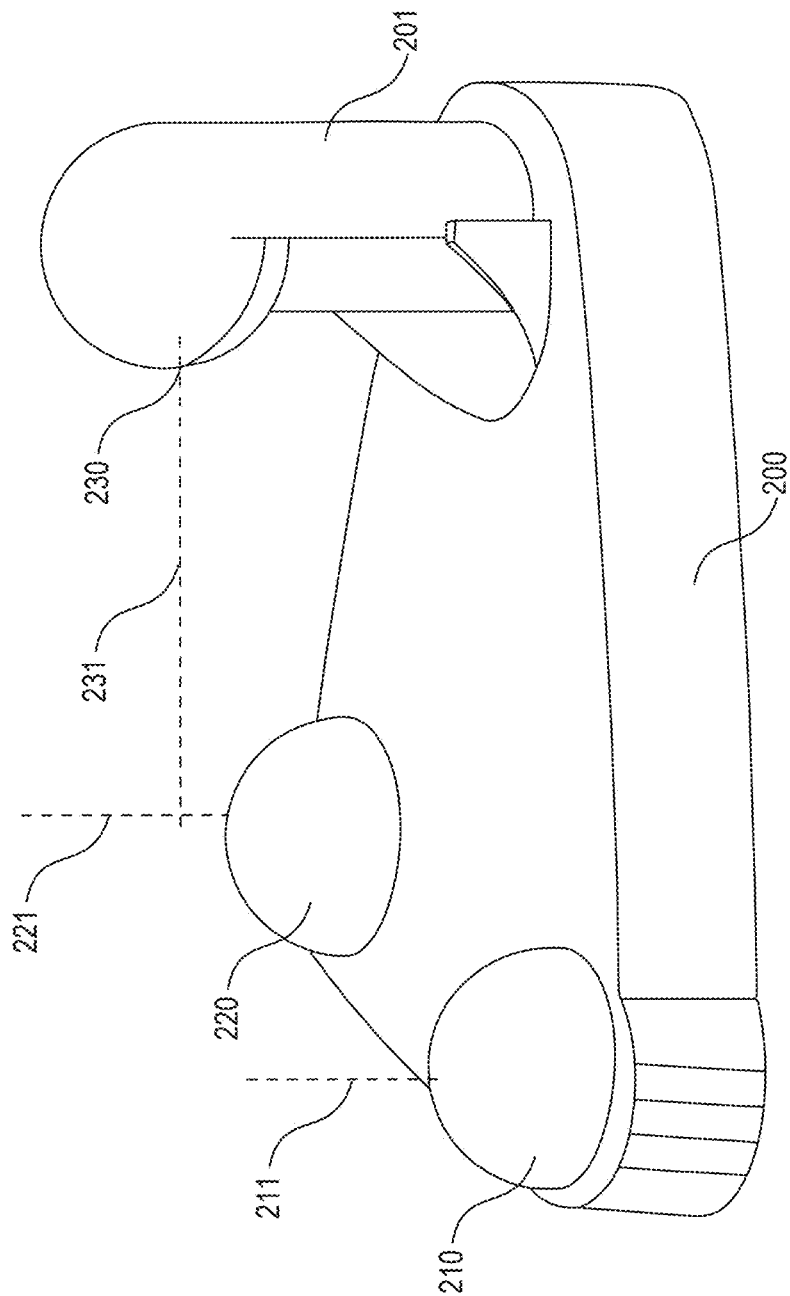
FIG. 7 shows a perspective view of an accessory for calibration.

FIG. 7 shows a perspective view of a calibration accessory for the measurement device. The calibration accessory comprises a base (200) of triangular cross section, with a perpendicular arm (201) and three hemispherical domes (210, 220, 230) positioned at reference points. Two of the hemispherical domes (210, 220) are positioned on the horizontal surface of the base (200), with parallel center axes (211, 221). The third hemispherical dome (230) is positioned on the perpendicular arm (201) with a center axis (231) that is perpendicular to the parallel center axes (211, 221) of the two other hemispherical domes (210, 220).

The measurement device is calibrated by pressing the three rings (14, 15, 30) against the three hemispherical domes (210, 220, 230) and checking that the measurement read on the vernier corresponds to the reference distance for the three hemispherical domes (210, 220, 230).

The invention claimed is:

1. A system for measuring a change in a crack, comprising:
    a measurement device including a body bearing a measurement instrument and having a first positioning member, and a movable member including a second positioning member; and
    at least two targets configured to cooperate with at least one of the first positioning member and the second positioning member, wherein:
        each of the at least two targets is hemispherical in shape and has a base; and
        the first positioning member and the second positioning member each comprise a ring having a cross section smaller than a cross section of the base of at least one of the at least two targets.

2. The system of claim 1, wherein one of the first positioning member and the second positioning member of the measurement device has two rings whose longitudinal axes are perpendicular.

3. The system of claim 1, wherein the at least two targets are attached to a wall by drop-in anchors and/or two-part epoxy adhesive.

4. The system of claim 1, further comprising a calibration accessory comprising a base equipped with two hemispherical domes having parallel axes, and a third hemispherical dome having an axis perpendicular to the parallel axes.

5. The system of claim 1, further comprising an inclination-measuring accessory comprising a base equipped with a first fixed hemispherical dome and an arm comprising a pendulum having a second fixed hemispherical dome at an end of the pendulum.

6. The system of claim 1, further comprising an accessory for measuring shear or misalignment comprising a base having curved grooves into which are fitted tabs provided at a front end of a body, a rear end of the body configured to accommodate a hemispherical dome, the body including a lateral arm having two hemispherical domes at an end thereof, the two hemispherical domes having axes of symmetry perpendicular to a mid-plane of the body and of the lateral arm.

7. The system of claim 6, wherein at least part of the two hemispherical domes is striated.

8. The system for measuring a change in a crack according to claim 1, wherein each of the at least two targets has a cross section larger than a cross section of each of the rings of the first positioning member and the second positioning member.

9. The system of claim 1, wherein the body has a cavity of complementary shape to a housing of a digital vernier and a ring on a side of the body opposite the cavity.

10. The system of claim 9, further comprising a calibration accessory comprising a base equipped with two hemispherical domes having parallel axes, and a third hemispherical dome having an axis perpendicular to the parallel axes.

11. The system of claim 10, further comprising an inclination-measuring accessory comprising a base equipped with a first fixed hemispherical dome and an arm comprising a pendulum having a second fixed hemispherical dome at an end of the pendulum.

12. The system of claim 11, further comprising an accessory for measuring shear or misalignment comprising a base having curved grooves into which are fitted tabs provided at a front end of a body, a rear end of the body configured to accommodate a hemispherical dome, the body including a lateral arm having two hemispherical domes at an end thereof, the two hemispherical domes having axes of symmetry perpendicular to a mid-plane of the body and of the lateral arm.

13. The system of claim 12, wherein the at least two targets are attached to a wall by drop-in anchors and/or two-part epoxy adhesive.

* * * * *